United States Patent
Yang et al.

(10) Patent No.: US 9,976,929 B2
(45) Date of Patent: May 22, 2018

(54) APPARATUS FOR VERIFYING THE INTEGRITY OF THE CONFINEMENT BOUNDARY OF A SPENT NUCLEAR FUEL DRY STORAGE CANISTER IN OPERATION

(71) Applicant: Institute of Nuclear Energy Research, Atomic Energy Council, Executive Yuan, R.O.C., Taoyuan (TW)

(72) Inventors: Ching-Wei Yang, Taoyuan (TW); Kuei-Jen Cheng, Taoyuan (TW); Yu-Tang Yang, Taoyuan (TW)

(73) Assignee: INSTITUTE OF NUCLEAR ENERGY RESEARCH, ATOMIC ENERGY COUNCIL, Executive Yuan, R.O.C., Lungtan, Taoyuan (TW)

( * ) Notice: Subject to any disclaimer, the term of this patent is extended or adjusted under 35 U.S.C. 154(b) by 122 days.

(21) Appl. No.: 14/887,498

(22) Filed: Oct. 20, 2015

(65) Prior Publication Data

US 2017/0108400 A1    Apr. 20, 2017

(51) Int. Cl.
| | |
|---|---|
| *G01M 3/20* | (2006.01) |
| *G01M 3/32* | (2006.01) |
| *G21F 5/008* | (2006.01) |
| *G01M 3/02* | (2006.01) |

(52) U.S. Cl.
CPC ............ *G01M 3/3209* (2013.01); *G01M 3/02* (2013.01); *G21F 5/008* (2013.01)

(58) Field of Classification Search
CPC ............ G01M 3/02; G01M 3/04; G01M 3/10; G01M 3/20; G01M 3/202; G01M 3/226
USPC .......................................................... 73/49.3
See application file for complete search history.

(56) References Cited

U.S. PATENT DOCUMENTS

| | | | | |
|---|---|---|---|---|
| 2,784,373 A | * | 3/1957 | Lawrance | G01M 3/329 324/461 |
| 3,393,552 A | * | 7/1968 | Burgess | G01M 3/202 73/40.7 |
| 3,646,804 A | * | 3/1972 | Myers | G01M 3/04 73/45.5 |
| 3,762,212 A | * | 10/1973 | Morley | G01M 3/202 376/250 |
| 4,636,475 A | * | 1/1987 | Price | G01M 3/226 252/964 |
| 4,785,666 A | * | 11/1988 | Bergquist | G01M 3/202 62/55.5 |
| 5,239,859 A | * | 8/1993 | Lehmann | B07C 5/3408 73/49.2 |

(Continued)

*Primary Examiner* — Alexander Mercado
(74) *Attorney, Agent, or Firm* — Jackson IPG PLLC; Demian K. Jackson

(57) ABSTRACT

An apparatus is provided to verify the integrity of the confinement boundary of a spent nuclear fuel dry storage canister in operation. An external-convection blocking device is used to temporarily isolate the dry storage system or the dry storage canister from the ambient environment to form an isolated space. A gas sampling-and-analyzing device is connected to the isolated space to measure the leak rate or concentration of helium or radioactive gases which release from the dry storage canister. After the leak rate or concentration of helium or radioactive gases is measured, the integrity of the confinement boundary of the dry storage canister can be verified to further enhance the safety of the spent nuclear fuel dry storage.

10 Claims, 2 Drawing Sheets

(56) References Cited

U.S. PATENT DOCUMENTS

| | | | | |
|---|---|---|---|---|
| 5,898,747 A * | 4/1999 | Singh | ................ | G21F 5/012 |
| | | | | 376/272 |
| 2003/0147486 A1* | 8/2003 | Singh | ................ | G21C 19/06 |
| | | | | 376/272 |
| 2009/0113995 A1* | 5/2009 | Golding | ................ | G01M 3/229 |
| | | | | 73/40.7 |
| 2014/0329455 A1* | 11/2014 | Singh | ................ | G21F 5/005 |
| | | | | 454/237 |

* cited by examiner

APPARATUS FOR VERIFYING THE INTEGRITY OF THE CONFINEMENT BOUNDARY OF A SPENT NUCLEAR FUEL DRY STORAGE CANISTER IN OPERATION

TECHNICAL FIELD OF THE INVENTION

The present invention relates to an apparatus used to verify the integrity of the confinement boundary of a spent nuclear fuel dry storage canister; more particularly, relates to the apparatus which could block the natural convection externally to form an isolated space and extract or sample the gas from it to verify the integrity of the confinement boundary of the spent nuclear fuel dry storage canister to improve the storage safety, where the isolated space is formed by temporarily separating the dry storage system or the natural convection channel inside the dry storage system from the ambient environment.

DESCRIPTION OF THE RELATED ART

A spent nuclear fuel dry storage canister is usually placed in an outer package which could shield the radiation which is from the stored spent nuclear fuels significantly. Therefore, traditional and common non-destructive tests cannot be used to verify the existence of defects caused by corrosion on the surface of the dry storage canister. As a result, the integrity of the confinement boundary of the dry storage canister cannot be assured.

Currently, some monitoring or inspection techniques, such as temperature monitoring, humidity monitoring, pressure monitoring, and environmental salt spray monitoring, can provide the qualitative information of the degradation of the confinement boundary materials for reference only. Although, using the industrial endoscope can visually check the surface of the dry storage canister through the air outlet of the outer package but cannot verify whether the corrosion if existing breaks the integrity of the confinement boundary of the canister or not.

Generally, the design service life of a dry storage system is more than 40 years. Therefore, it is not easy to prevent the materials used to form the confinement boundary of a dry storage canister from being degraded or corroded. However, if mending or even scraping a dry storage canister just because of the minor degradation or corrosion of the materials used to form the confinement boundary, it will be costly and would not be economical. On the other hand, if the integrity of the confinement boundary of a dry storage canister has been broken, but the adapted test method cannot verify it, the radioactive materials stored in the canister may leak out, and this would affect the safety of the spent nuclear fuel dry storage.

Hence, the prior art does not fulfill all users' requests on actual use.

SUMMARY OF THE INVENTION

The main purpose of the present invention is to measure the leak rate or concentration of helium or radioactive gases outside of a dry storage canister to verify the integrity of the confinement boundary of the dry storage canister. If the leak rate or concentration of helium or radioactive gases is significantly higher than the one exists in the ambient environment, this means the confinement boundary is not integral.

To achieve the above purpose, the present invention is an apparatus for verifying the integrity of the confinement boundary of a spent nuclear fuel dry storage canister in operation, comprising an outer package, a dry storage canister, an external-convection blocking device and a gas sampling-and-analyzing device, where the outer package comprises an air inlet, an air outlet, a package body and a lid; the package body has a storage space which connects with the air inlet and the air outlet; the dry storage canister is placed inside the outer package to form a dry storage system; the clearance between the outer package and the dry storage canister forms the natural convection channel which connects the air inlet and the air outlet; the external-convection blocking device works with the outer package to block the natural convection with the ambient environment to form an isolated space; the external-convection blocking device comprises a blocking body and a sampling unit; and the gas sampling-and-analyzing device is connected with the external-convection blocking device to measure the leak rate or concentration of helium or radioactive gases in the isolated space through the sampling unit to verify the integrity of the confinement boundary of the dry storage canister. Accordingly, a novel apparatus for verifying the integrity of the confinement boundary of a spent nuclear fuel dry storage canister in operation is obtained.

BRIEF DESCRIPTION OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

The following description of the preferred embodiment is provided to understand the features and the structures of the present invention.

Figure 1:
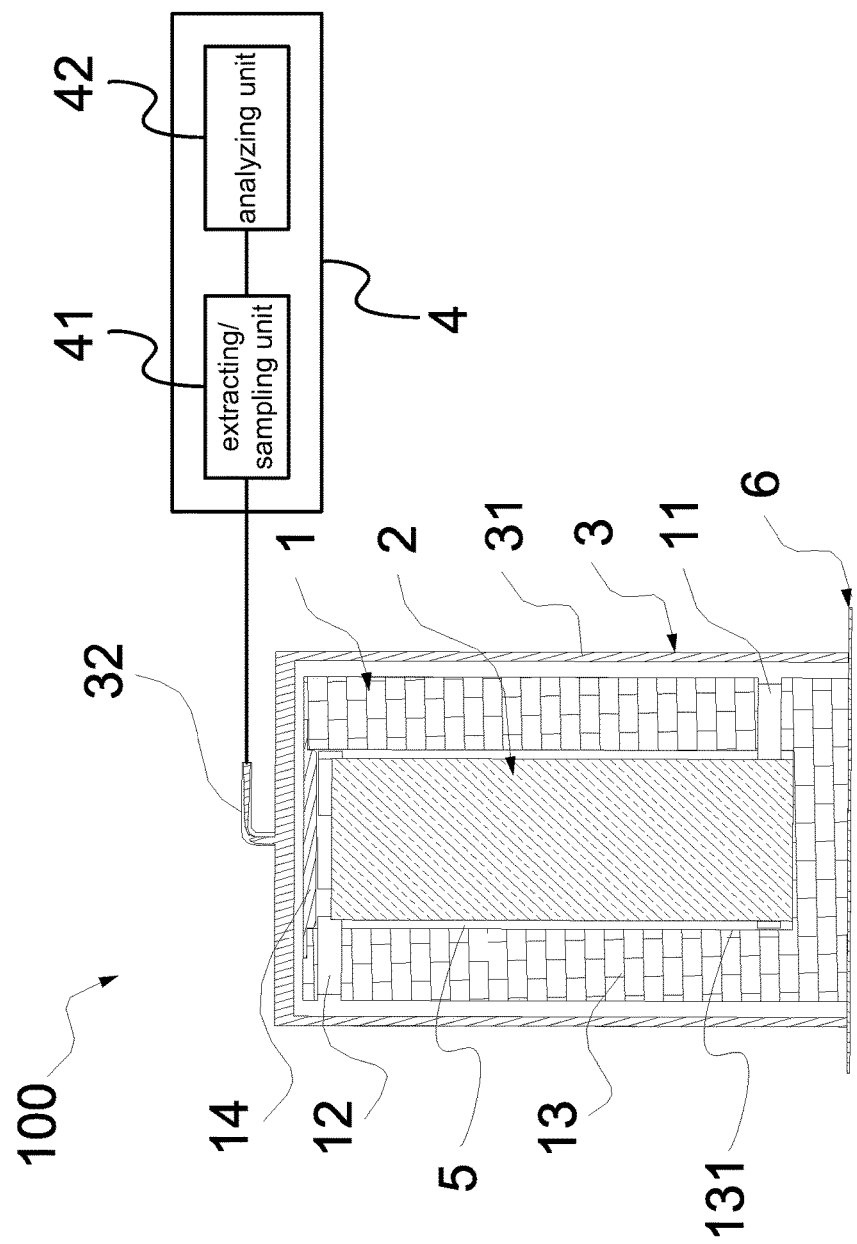
FIG. 1 is the sectional structural view showing the first state-of-use of the preferred embodiment according to the present invention.

Please refer to FIG. 1, which is a sectional structural view showing a first state-of-use of a preferred embodiment according to the present invention. As shown in the figure, the present invention is an apparatus 100 for verifying the integrity of the confinement boundary of a spent nuclear fuel dry storage canister in operation, comprising an outer package 1, a dry storage canister 2, a hood 3 and a gas sampling-and-analyzing device 4. The hood is an external-convection blocking device.

The outer package 1 comprises an air inlet 11, an air outlet 12, a package body 13 and a lid 14. The package body 13 has a storage space 131. The storage space 131 connects with the air inlet 11 and the air outlet 12. The outer package 1 stores the dry storage canister 2 inside it to shield the radiation from the stored spent nuclear fuels. The air inlet 11 and the air outlet 12 are constructed on the external wall of the outer package 1 to assist the occurrence of natural convection to remove the decay heat, which is generated by the spent nuclear fuels stored in the dry storage canister 2 to the ambient environment to prevent the dry storage canister 2 from damage due to being overheated and to further avoid the leakage of the stored radioactive materials.

The dry storage canister 2 is placed inside the outer package 1 to form a dry storage system, where a clearance 5 is formed between the outer package and the dry storage canister. The dry storage canister 2 is used to store spent nuclear fuels to avoid leakage of radioactive materials. In operation, the dry storage canister 2 is filled with helium to form an inert environment to prevent the cladding of the stored spent nuclear fuels from degradation.

The hood 3 is installed outside of the outer package 1 without fully contacting with it. The hood 3 comprises a hood body 31 and a sampling tube 32. An isolated space is formed by the hood 3, the package body 13 and the lid 14.

The gas sampling-and-analyzing device 4 is connected with the sampling tube 32 of the hood 3. The gas sampling-and-analyzing device 4 comprises an extracting/sampling unit 41 and an analyzing unit 42.

Thus, an apparatus for verifying the integrity of the confinement boundary of a spent nuclear fuel dry storage canister in operation is obtained.

The hood 3 can completely wrap the dry storage system and cut off the connection between the dry storage system and the ambient environment.

Or the hood 3 can completely cover the dry storage system without wrapping it and cut off the connection between the dry storage system and the ambient environment.

The sampling tube 32 of the hood 3 has functions of opening and closing.

On using the first state-of-use according to the present invention, the dry storage canister 2 is placed in the storage space 131 of the package body 13 of the outer package 1. The hood 3 is installed outside of the outer package 1. Bottom of the hood body 31 contacts with the ground of the storage site to cut off the connection between the dry storage system and the ambient environment to form an isolated space. Thus, if the confinement boundary breaches, the helium or radioactive gases leaked out from the confinement boundary of the dry storage canister 2 would not escaped into the ambient environment but be kept in the isolated space. Because the density of helium is lower than the air, helium leaked out from the confinement boundary of the dry storage canister 2 will be accumulated in the upper portion of the hood 3. Besides, radioactive gases are easily detected in current technology even the quantity is very small. The sampling tube 32 is set on the top of the hood 3 to extract or sample the gases in the upper portion of the hood 3 to measure leak rate or concentration of helium or radioactive gases to verify the integrity of the confinement boundary of the dry storage canister 2. Therein, the sampling tube 32 can separate the inside of the hood 3 from contacting with the ambient environment during the non-extracting or non-sampling period. Or the extracting/sampling unit 41 can extract or sample the gases inside the hood 3 through the sampling tube 32 during extracting or sampling period. The extracted or sampled gases would be analyzed by the analyzing unit 42 to verify the integrity of the confinement boundary of the spent nuclear fuel dry storage canister.

Figure 2:
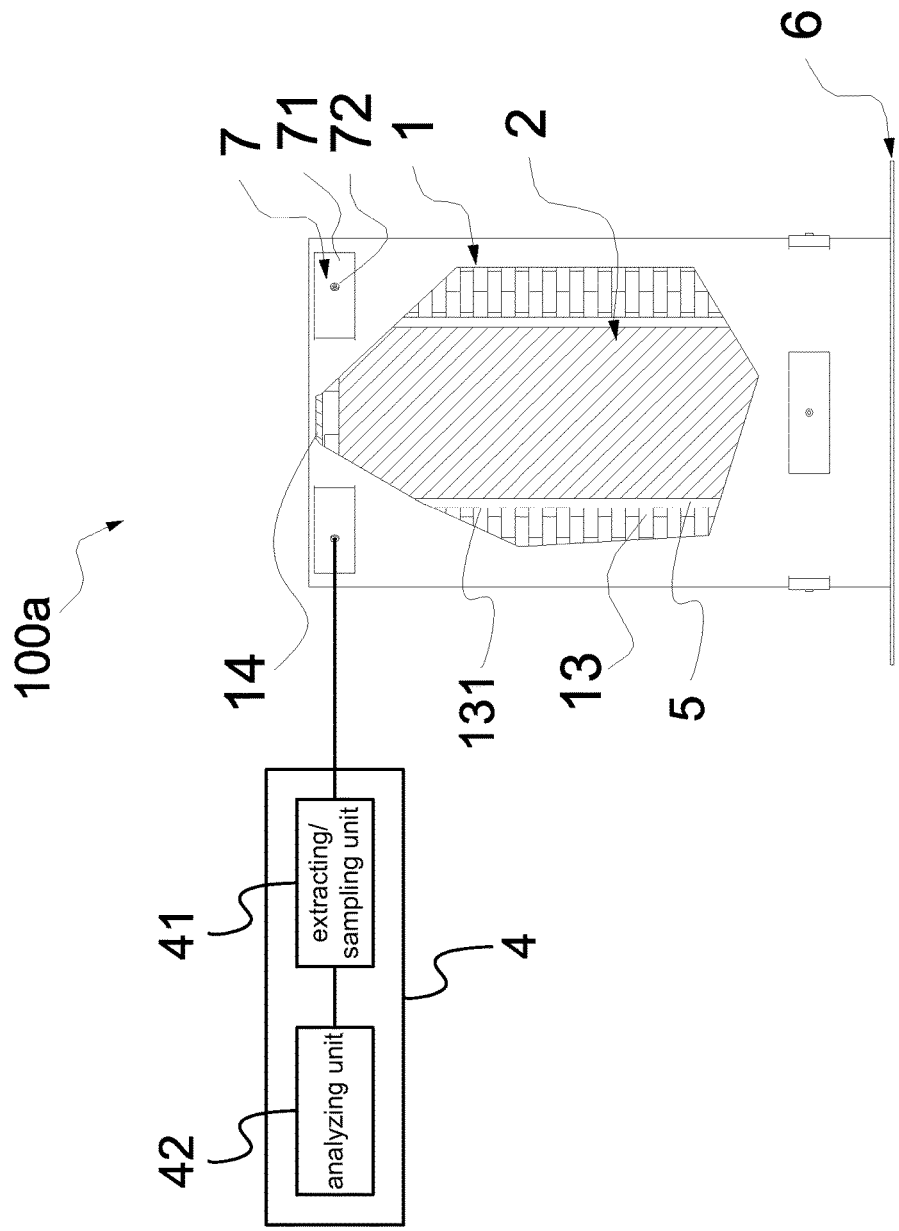
FIG. 2 is the structural sectional view showing the second state-of-use.

Please further refer to FIG. 2, which is a sectional structural view showing a second state-of-use. As shown in the figure, the present invention not only can be constructed as the apparatus shown in FIG. 1; but also can be constructed as an apparatus shown in FIG. 2. The main difference in this embodiment from the previous one is this embodiment utilizes cover plate 7 as the external-convection blocking device. The cover plate 7 is installed on and covered the air inlet 11 and the air outlet 12 of the outer package 1. The cover plate 7 comprises a plate body 71 and a sampling joint 72. An isolated space is formed by the cover plate 7 and the natural convection channel inside the dry storage system.

The cover plate 7 partially covers or encloses the dry storage system to form an isolated space to separate the dry storage canister from contacting with the ambient environment.

The sampling joint 72 of the cover plate 7 has functions of opening and closing.

On using the second state-of-use, the dry storage canister 2 is placed in the storage space 131 of the package body 13 of the outer package 1. The cover plate 7 is installed on and covered the air inlet 11 and the air outlet 12 of the outer package 1. With working with the package body 13 and the lid 14, the helium or radioactive gases leaked out from the confinement boundary of the dry storage canister 2 would not escape into the ambient environment but accumulated in the clearance 5 of the isolated space between the outer package 1 and the dry storage canister 2. The cover plate 7 has the sampling joint 72 to extract or sample the gases in the isolated space between the outer package 1 and the dry storage canister 2 to measure the leak rate or concentration of helium or radioactive gases to verify the integrity of the confinement boundary of the dry storage canister 2. The plate body 71 has a tube or pipe to connect the clearance 5 with the sampling joint 72. Therein, the sampling joint 72 can separate the isolated space from contacting with ambient environment during the non-extracting or non-sampling period. Or the extracting/sampling unit 41 can extract or sample the gases in the clearance 5 through the sampling joint 72 during extracting or sampling period. The extracted or sampled gases would be analyzed by the analyzing unit 42 to verify the integrity of the confinement boundary of the spent nuclear fuel dry storage canister.

Thus, the present invention is applied to the spent nuclear fuel dry storage system in operation. After the dry storage canister 2 is placed inside the outer package 1 to form a dry storage system, the hood 3 or the cover plate 7 which works with outer package 1 forms the isolated space to cut off the connections between the dry storage canister 2 and the ambient environment. Thus, the helium or radioactive gases leaked out from the confinement boundary of the dry storage canister 2 would not escape into the ambient environment. Within the allowable full-blockage time stated in the safety analysis report of the dry storage system, the internal temperature and pressure of the dry storage canister 2 would increase because the natural convection are blocked. If the integrity of the confinement boundary of the dry storage canister 2 is broken due to material degradation or corrosion, the gases inside the dry storage canister 2 would release into the isolated space but would not escape into the ambient environment. The extracting/sampling unit 41 of the gas sampling-and-analyzing device 4 uses the sampling tube 32 of the hood 3 or the sampling joint 72 of the cover plate 7 to extract or sample the gases from the isolated space on the upper portion of the hood 3 or from the isolated space between the outer package 1 and the dry storage canister 2. Thereby, the leak rate or concentration of helium or radioactive gases is measured to verify the occurrence of leakage of the dry storage canister 2 and further to assure the integrity of the confinement boundary.

To sum up, the present invention is an apparatus for verifying the integrity of the confinement boundary of a spent nuclear fuel dry storage canister in operation, where utilizing the hood 3 or the cover plate 7 cuts off the connection between the dry storage system or the dry storage canister 2 and the ambient environment to verify the confinement boundary breaches or not to assure the integrity of the confinement boundary of a storage canister in operation.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. An apparatus for verifying integrity of a confinement boundary of a spent nuclear fuel dry storage canister consisting of:
    an outer package comprising an air inlet, an air outlet, a package body defining a storage space connected to the air inlet and outlet such that convection can occur between the air inlet and outlet, and a lid;
    a dry storage canister placed inside the storage space, wherein a clearance is obtained between said outer package and said dry storage canister supporting convection between the air inlet and outlet within the outer package;
    an external-convection blocking device encasing the outer package and dry storage canister, said external-convection blocking device comprising a device body and a sampling unit, said external-convection blocking device blocking out the ambient environment and configured to obtain an isolated space in combination with the outer package to form a natural convection channel to sample gases in said isolated space; and
    a gas sampling-and-analyzing device connected with the sampling unit of said external-convection blocking device and configured to measure at least one of a leak rate and a concentration of helium or radioactive gases in said isolated space to verify integrity of the confinement boundary of said dry storage canister.

2. The apparatus according to claim 1, wherein said external-convection blocking device is a hood; said device body is a hood body; and said sampling unit is a sampling tube; wherein said hood is placed outside of said outer package and does not fully contact with said outer package; and wherein said isolated space is obtained between said hood, said package body, and said lid.

3. The device according to claim 2, wherein a lower end of the hood body is configured to contact the ground of a storage site.

4. The device according to claim 2, wherein said hood completely wraps a dry storage system formed by said dry storage canister and said outer package; and separates said dry storage system from contacting with the ambient environment.

5. The device according to claim 2, wherein, except a bottom of said dry storage system, said hood completely covers a dry storage system formed by said dry storage canister and said outer package; and separates said dry storage system from contacting with the ambient environment.

6. The device according to claim 2, wherein said sampling tube is configured to selectively open and close between the external-convection blocking device and the gas sampling-and-analyzing device.

7. The device according to claim 1, wherein said external-convection blocking device further consisting of a cover plate; said device body is a cover body; said sampling unit is a sampling joint; and said cover plate is installed on and covers the air inlet and air outlet of said outer package; and wherein said isolated space is obtained between said cover plate and a natural convection channel inside a dry storage system defined by the dry storage canister and the outer package.

8. The device according to claim 7, wherein said cover plate partially covers or encloses said outer package and separates said dry storage canister from contact with the ambient environment.

9. The device according to claim 7, wherein said sampling joint is configured to selectively open and close between the external-convection blocking device and the gas sampling-and-analyzing device.

10. An apparatus for verifying integrity of a confinement boundary of a spent nuclear fuel dry storage canister consisting of:
    an outer package comprising an air inlet, an air outlet, a package body defining a storage space connected to the air inlet and outlet such that convection can occur between the air inlet and outlet, and a lid, wherein the outer package is configured to receive a dry storage canister in the storage space such that a clearance is defined between the outer package and the dry storage canister and to support convection between the air inlet and outlet within the outer package;
    an external-convection blocking device encasing the outer package and comprising a device body and a sampling unit, the external-convection blocking device blocking out the ambient environment and configured to obtain an isolated space in combination with the outer package to form a natural convection channel to sample gases in said isolated space; and
    a gas sampling-and-analyzing device connected with the sampling unit of the external-convection blocking device and configured to measure at least one of a leak rate and a concentration of helium or radioactive gases in the isolated space to verify integrity of the confinement boundary of the dry storage canister.

* * * * *